US006876794B2

(12) United States Patent
Zheng et al.

(10) Patent No.: US 6,876,794 B2
(45) Date of Patent: Apr. 5, 2005

(54) MULTI-WAVEGUIDE LAYER H-TREE DISTRIBUTION DEVICE

(75) Inventors: Jun-Fei Zheng, Palo Alto, CA (US); Ian Young, Portland, OR (US)

(73) Assignee: Intel corporation, Santa Clara, CA (US)

( * ) Notice: Subject to any disclaimer, the term of this patent is extended or adjusted under 35 U.S.C. 154(b) by 0 days.

(21) Appl. No.: 10/364,624

(22) Filed: Feb. 10, 2003

(65) Prior Publication Data

US 2004/0156591 A1 Aug. 12, 2004

(51) Int. Cl.[7] .................................................. G02B 6/26
(52) U.S. Cl. ............................ 385/45; 385/14; 385/124
(58) Field of Search .............................. 385/14, 24, 45, 385/123, 124, 129–131

(56) References Cited

U.S. PATENT DOCUMENTS

| 5,416,861 | A | 5/1995 | Koh et al. ..................... 385/14 |
| 6,351,576 | B1 * | 2/2002 | Ding ........................... 385/14 |

OTHER PUBLICATIONS

Chen, "Fully embedded Guided–wave Optical Interconnects with Full Packaging Compatibility with Microelectronics" [online] (projected publication Jan., 2003).
Koh, "OptoElectronic Multichip Modules Using MEMS Fabrication Techniques," 61–62 (1998).
Koh, "Optoelectronic multichip modules for high–speed computer systems and communication networks," Optical Engineering 36(5):1319–1325 (1997).
Koh, "Synchronous global clock distribution on multichip modules using optical waveguides," Optical Engineering 33(5):1587–1595 (1994).
Mehrotra, et al., "Technology Scaling Impact of Variation on Clock Skew and Interconnect Delay," International Interconnect Technology Conference (Jun. 5, 2001).
Mule, et al., "Input Coupling and Guided–wave Distribution Schemes for Board–level Intra–chip Guided–wave Optical Clock Distribution Network Using Volume Grating Coupler Technology," (Jun. 5, 2001).
Mule, et al., "An optical clock distribution network for gigascale integration," Interconnect Technology Conference IEEE (2000).
Wu, et al., "Guided–wave optical clock signal distribution system" [online] (projected first publication Jan. 10, 1998).
Gan et al., "Integration of 45–degree Micro–couplers in Guided–wave Optical Clock Distribution System for Supercomputer," 1998 International Symposium on Microelectronics.
Horst, et al., "Compact, Tunable, Optical Devices in Silicon–Oxynitride Waveguide Technology," (1999) Optical Society of America.
Wu et al., "Board–level Optical Clock Signal Distribution Using Si C–MOS Compatible Polyimide–based 1–to–48 Fanout H–tree," SPIE vol. 3551 1998.

* cited by examiner

Primary Examiner—Phan T. H. Palmer
(74) Attorney, Agent, or Firm—Marshall, Gerstein & Borun LLP (57) ABSTRACT

An optical network is formed of multiple H-tree distribution devices, separated into different waveguide layers. The optical network receives an input optical signal, such as an optical clock signal, and makes duplicate copies of that input signal. The duplicate copies are routed through the connected H-tree distribution devices, which are arranged to produce identical, synchronized copies of the clock signal. The network can take the form of a $1 \times 2^N$ device, where $2^N$ represents the number of these output signals. The H-tree distribution devices forming the network are of varying size and may be formed in different waveguide layers with different index of refraction differentials between the H-tree devices and surrounding claddings. In some forms, the optical network is integrated with optical-to-electrical converters, i.e., photodetectors, which take the optical output signals and convert them to synchronized electrical signals that may be communicated to digital circuits.

41 Claims, 7 Drawing Sheets

MULTI-WAVEGUIDE LAYER H-TREE DISTRIBUTION DEVICE

FIELD OF THE DISCLOSURE

This patent generally relates to signal propagation and more specifically to H-tree distribution of a signal.

BACKGROUND OF THE PRIOR ART

For digital systems, accurate timing is crucial to data transmission. Clocking signals therefore are crucial to digital systems, because clocking signals set the timing for the components in the systems. A computer motherboard, for example, might have a single master clock signal that is transmitted to and synchronized with integrated circuit boards, chipsets, peripherals, or other components connected to the motherboard. All system components may be synchronized using this master clock signal.

Various techniques exist for generating and distributing clock signals within a digital system. For example, a primary clock signal might be generated by a ring oscillator or a separate clock chip (e.g., a crystal oscillator). The clock signal may then be routed from the generator to each of the devices connected to the clock. These techniques use electrical clock signals, i.e., clock signals traveling along metallic or semiconductor conduits. Unfortunately, clock signals in the electrical domain present numerous design limitations.

Ideally, clock signals would have a well defined duration, consistent shape, and zero propagation path dependence. In reality, clock signals have variable rise and fall times, noticeable jitter, and noticeable path-dependent skew, a particular problem that arises from timing differences and waveform variation between clock signals. There is also a sizeable power drain associated with electrical clock signals.

Typically, clock signals are distributed throughout a system via a distribution network. In theory, the network would make duplicate copies of a clock signal and provide identical paths for each duplicate copy, so that any device connected to the network would receive a synchronized clock signal. In reality, however, skew and jitter problems abound, primarily due to electrical load differences among the various paths and parasitic effects within the network.

Recently, some have proposed moving away from a purely electrical domain digital clocking system to an optical domain clocking system. Using optical signals, i.e., light pulses, presents some obvious theoretical advantages. Optical signals are not susceptible to load variations or parasitic effects, because they travel through waveguides and not conducting metallic wires. Also, optical signals may propagate at much faster clock rates. Electrical clock signals have a theoretical limit of about 25 GHz for signal transmission of about 5 mm, while optical clock signals may extend into the THz range and travel much longer distances, thus allowing for a digital system with orders of magnitude faster performance capabilities.

In the optical clock networks proposed for clock signal distribution, a network distributor generates or receives a clock signal, and that signal is then split into multiple signals by a Y-branch splitter, multimode interferometer or similar device. Each copy of the clock signal is then provided to one output waveguide, where all the output waveguides are of equal length to keep the copies of the clock signal in phase.

While optical networks do not have the impedance load variation and parasitic problems of electrical domain networks, they have their share of shortcomings. One of the main problems affecting optical networks is modal confinement. For an optical signal to propagate and not lose its waveform or intensity, the signal's mode must be confined to the propagating waveguide. Further still, its mode profile must stay constant over the propagation length of that waveguide. This means that the waveguides must have a higher index of refraction differential with respect to their surrounding cladding layers. This also means that only waveguides of certain bending radii (typically quite large) are used to avoid bending losses. Unfortunately, large bending radii result in large devices and, as such, limit device scalability. The problem is multiplied with network complexity.

DETAILED DESCRIPTION

Various optical devices are described. Although the descriptions are provided in the context of propagating an optical clock signal, it will be understood by persons of ordinary skill in the art that the examples are not limited to the transmission of optical clock signals. The devices described may be used to distribute any information carrying optical signal. Furthermore, while the techniques described are provided in the context of distributing an input optical signal into a plurality of output signals, the techniques may be used on any number of optical devices to provide increased scalability and performance.

Figure 1:
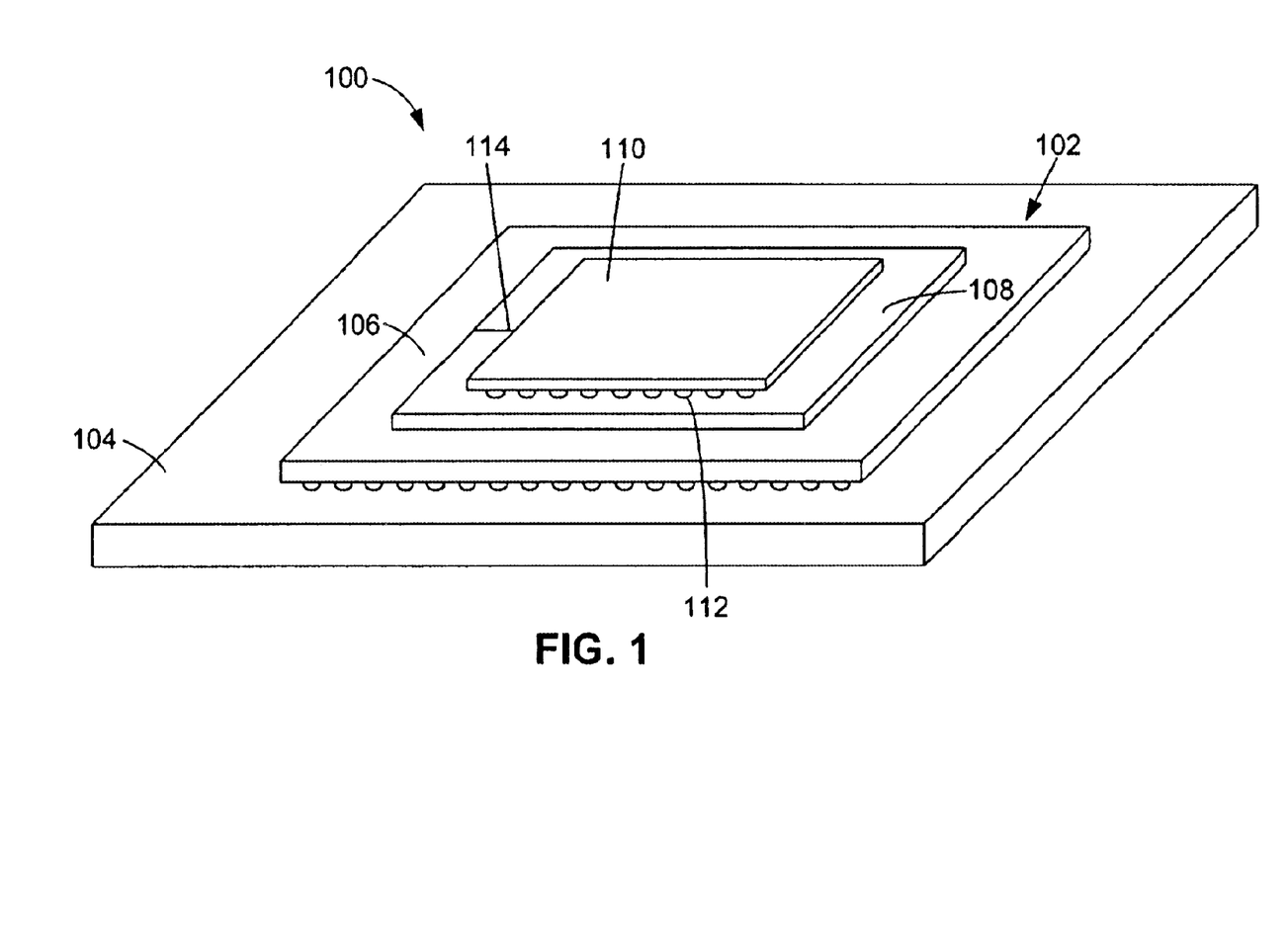
FIG. 1 is an illustration of a device having a clock distribution device and a digital microchip.

FIG. 1 illustrates an example device 100 that includes an integrated chip module 102 mounted on a substrate 104 that may be a printed circuit board, for example. The integrated chip module 102 includes a mounting substrate 106 which may be a DIP package or Ball Grid Array (BGA), for example. The integrated circuit module 102 also includes a clock distribution device 108 and a digital microchip 110 mounted to the clock distribution device 108. In the illustrated configuration, the clock distribution device 108 is mounted directly to the mounting substrate 106.

The digital chip 110 may be any known digital chip including a microprocessor, an application specific integrated chip (ASIC), chipset, or the like. Example digital chips include those from the Intel Corporation family of microprocessors, of which the Intel Pentium® microprocessor is an example. The digital chip 110 may represent a device having multiple subsystems that are each capable of receiving a separate clock signal.

The clock distribution device 108 is an optical network capable of creating and distributing multiple clock signals in an optical domain. Further, the distribution device 108 is an integrated device with optical-to-electrical (O/E) converters that convert optical domain clock signals into electrical domain clock signals, which may then be provided to the digital chip 110 via a BGA 112, in the illustrated example. The O/E converter is also termed a photodetector herein, of which a photodiode is an example. Also, the distribution device 108 may include output waveguides without O/E conversion to provide optical clock signals.

In operation, the distribution device 108 is fed with a master clock signal via an input waveguide 114. The clock signal may be from an external waveguide such as an optical fiber coupled to a clock generating circuit, not shown. The master clock signal is routed throughout the distribution device 108, which creates as many copies of the master clock signal as desired. By way of example only, the distribution device 108 may be a 1×2×2 (1 to 4), 1×2×2×2×2 (1 to 16), 1×2×2×2×2×2×2 (1 to 64), or 1×$2^N$ distribution network, taking in one input clock signal and, in the latter example, generating $2^N$ identical versions of that clock signal.

The distribution device 108, being an optical distribution network, will propagate clock signals of a much higher frequency than is achievable with traditional electrical distribution devices. Also, the distribution device 108 produces clock signals with reduced skew and reduced jitter, i.e., with less variation between the clock signals as compared to electrical distribution devices due to equal propagation length management by the optical network within the device 108.

Figure 2:
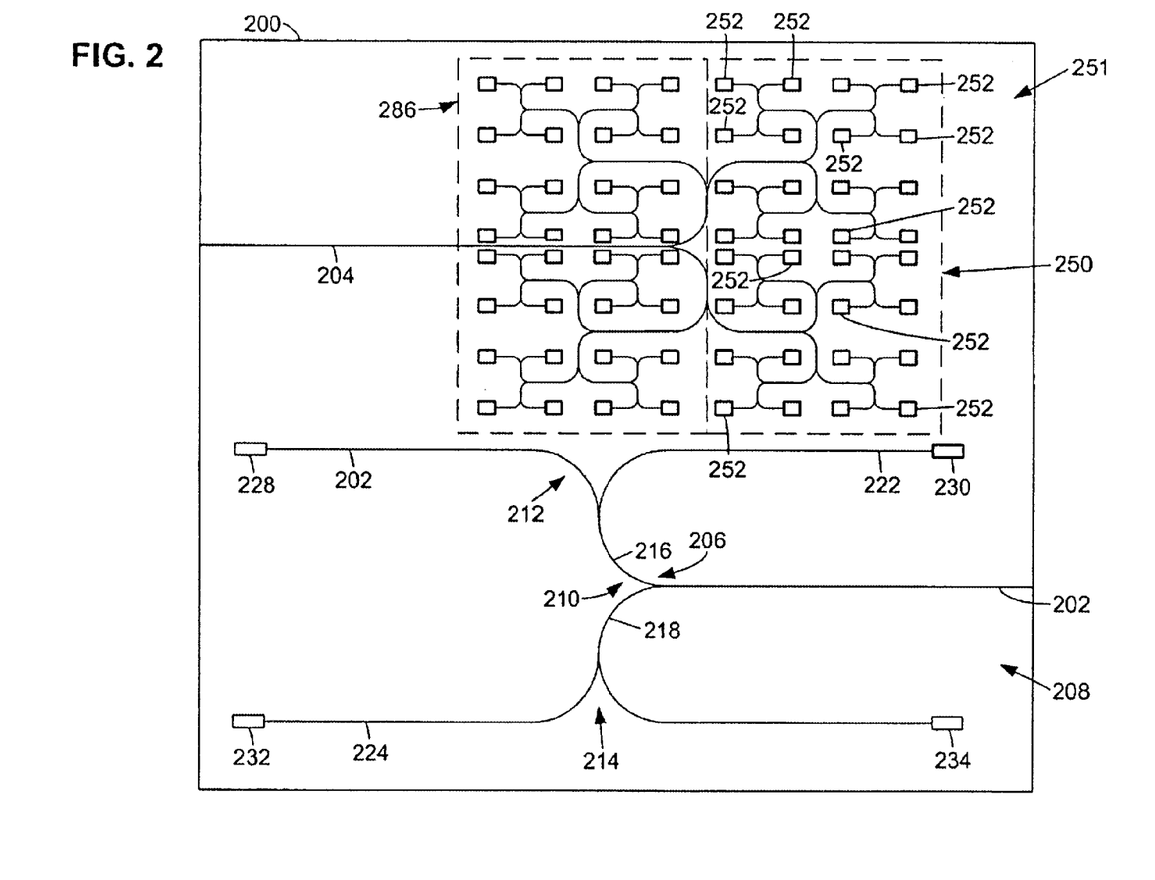
FIG. 2 is an illustration of an optical distribution device with an H-tree distribution network that may be used as the clock distribution device of FIG. 1.

FIG. 2 illustrates a top view of an example distribution device 200 that may be used as the distribution device 108. The distribution device 200 is an optical device with two input optical waveguides 202 and 204. The input waveguide 202 is connected to an H-tree distribution device 206 formed in a first section 208 and formed of three interconnected Y-branches 210, 212, and 214. Output branches 216 and 218 of the Y-branch 210 couple as inputs to the Y-branches 212 and 214, respectively. The Y-branch 212 has output branches 220 and 222, and the Y-branch 214 has output branches 224 and 226. The three Y-branches 210, 212, and 214 form the H-tree distribution device 208, which is a 1×2×2 distribution device.

With the Y-branches 212, 214, and 216 each being 50/50 splitters and each being substantially the same in shape and dimension, the output branches 220, 222, 224, and 226 will transmit substantially identical copies of the input clock signal on the waveguide 202. Photodetectors 228, 230, 232 and 234 are used for O/E conversion of the signal on those output branches 220, 222, 224, and 226, respectively. The photodetectors 228, 230, 232 and 234 may be silicon photodiodes, for example.

Figures 3, 5:
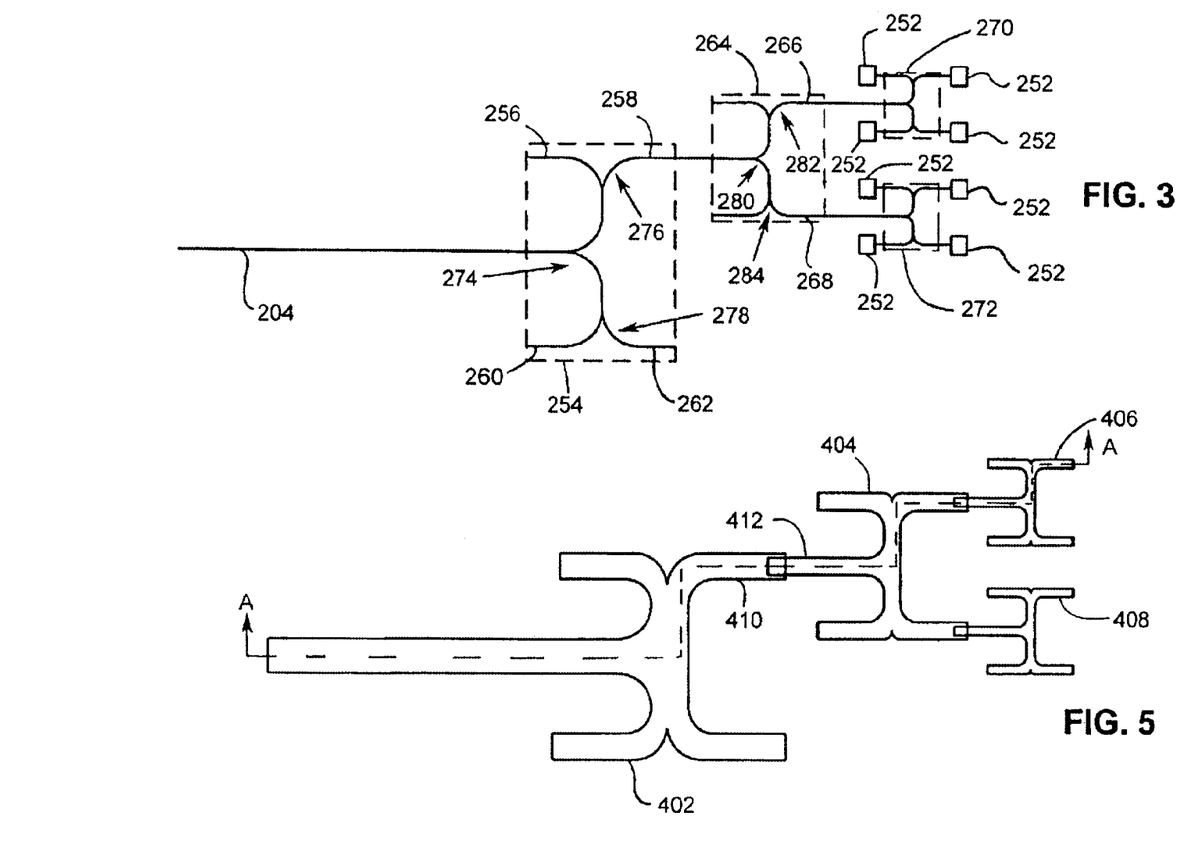
FIG. 3 is an exploded illustration of a portion of the H-tree distribution network of FIG. 2, showing H-tree distribution devices of different size.
FIG. 5 is an illustration of a series of interconnected H-tree distribution devices of differing size.

The input waveguide 204 is connected to a first H-tree distribution network 250 in a second section 251 of the device 200. The network 250 has 32 output waveguides each connected to an O/E converter 252 and each providing an identical copy of an input signal received on the input waveguide 204. For readability, not all of the illustrated O/E converters 252 in the network 250 are numbered with a reference numeral. Nonetheless, the converters 252 are substantially identical in the illustrated example to ensure that the clock signals produced by the network 250 are in phase when converted to the electrical domain. The H-tree network 250 is formed from a plurality of interconnected individual H-trees distribution devices. As illustrated in FIG. 3, the waveguide 204 is an input waveguide for a first H-tree distribution device 254, or primary H-tree distribution device. The H-tree distribution device 254 includes four output waveguides 256, 258, 260, and 262, each carrying a substantially identical output signal derived from the input signal coupled from the input waveguide 204. The output signals from the device 254 are attenuated copies of the input signal but are still in phase with one another. The output waveguide 258 is coupled to a secondary H-tree distribution device 264, which has two output waveguides 266 and 268 coupled to H-tree distribution devices 270 and 272, respectively. As with the H-tree distribution device 254, each H-tree distribution device 264, 270, and 272 receives a signal, an output signal from a next larger H-tree distribution device, and creates four substantially identical output signals. In an example, the input signal may be an optical clock signal, for example, one produced by a mode locked laser source.

As depicted in the illustrations of FIGS. 2 and 3, the network 250 is formed of individual H-tree distribution devices of differing size. For example, the H-tree distribution device 254 is a level 1 structure that spans a larger area, as shown, than the H-tree distribution device 264, which is a level 2 structure. Further, the H-tree distribution device 264 spans a larger area, as shown, than the level 3 H-tree distribution devices 270 and 272, which, in the illustrated example, span an identical area. The level indications used herein are for convenience purposes to describe H-tree distribution devices of different size in area and that exist within different waveguide layers, as will be described in more detail below. The area spanned by a particular H-tree distribution device, in plan view, includes at least the three Y-branches forming that device including at least a portion of the input and out waveguides for each of the three Y-branches.

In the illustrated example, the differences between structures of different levels are not only differences in overall area, but are also differences in Y-branch radius of curvature. The H-tree distribution device 254, for example, is formed of three Y-branches 274, 276, and 278 (see FIG. 3), each with branches of identical radius of curvature. This radius of curvature is larger than the radius of curvature for three Y-branches 280, 282, and 284 forming the H-tree distribution device 264. That is, the radius of curvature on the level 1 structure is larger than the radius of curvature on the level 2 structure(s). Similarly, the radius of curvature on the Y-branches 280, 282, and 284 is larger than the radius of curvature of the Y-branches (not labeled) forming the level 3 structures 270 and 272.

The network 250 is symmetrical and provides substantially identical input signals at the O/E converters 252. As a result, although not depicted in FIG. 3, there is a second level 2 (or secondary) H-tree distribution device, substantially identical to assembly 264, coupled to each of the output waveguides 254, 256, and 262. Further, each of these level 2 assemblies are connected to four level 3 assemblies that are themselves identical to one another, and for the illustrated example, would be identical to assemblies 270 and 272. The assembly 264 is shown in FIG. 3 coupled to only two such level 3 structures (270 and 272) for simplification purposes only. FIG. 2 illustrates that the input waveguide 204 may be coupled to the first H-tree distribution network 250 and a second H-tree distribution network 286 that is identical to the network 250 and, as such, not described further herein.

Figure 4:
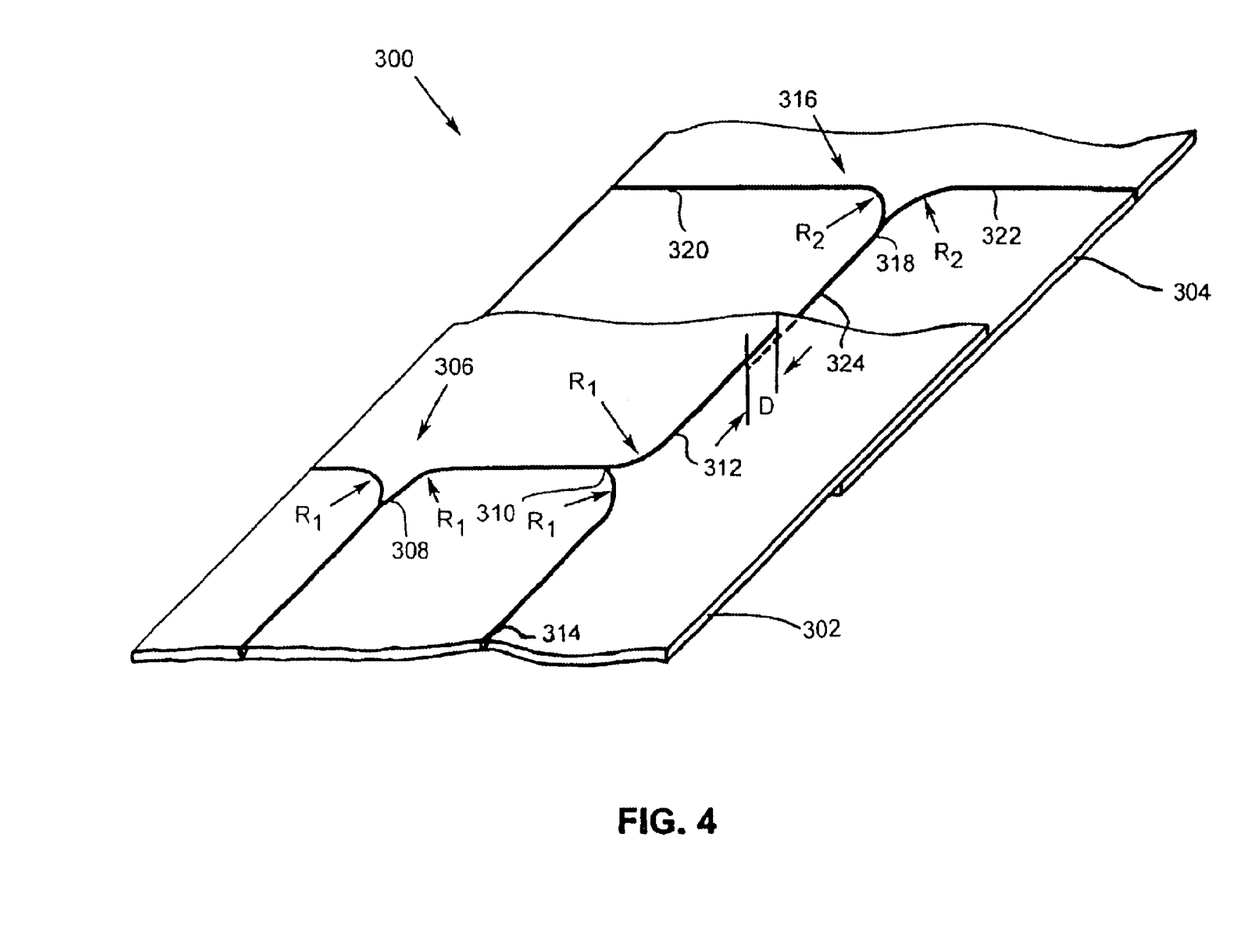
FIG. 4 is a partial illustration of two waveguide layers each containing at least one H-tree distribution device.

In addition to indicating relative size, the level indications on various structures depicted herein may also describe the location of the structure relative to other structures. FIG. 4 is a partial illustration of a device 300 formed of two waveguide layers 302 and 304 disposed adjacent one another. All of the waveguide layers described herein may provide a cladding region and a waveguide core region. The first waveguide layer 302 includes a level 1 structure in the form of an H-tree distribution device 306 (partially shown) that may be formed in the layer 302 through deposition, photolithographic, chemical etch, deposition again, and planarization processing, for example. A first Y-branch 308, a second Y-branch 310, and output waveguides 312 and 314 of the H-tree distribution device 306 are shown, and all are formed in the layer 302. This layer 302 may be deposited, formed, clamped, or bonded on the layer 304, after a level 2H-tree distribution device 316 (partially shown) has been formed therein. FIG. 4 illustrates a Y-branch 318 of the H-tree distribution device 316 having branching waveguides 320 and 322. In line with the examples of FIGS. 2 and 3, the H-tree distribution device 306 has a radius of curvature, $R_1$. As illustrated, the H-tree distribution device 316 has a radius of curvature, $R_2$, where $R_1 > R_2$. That is, a tighter radius of curvature is used in the level 2 structure 316. As the illustration of FIG. 4 shows, the device 300 has the H-tree distribution device 306 formed at a first depth of the device 300 and the H-tree distribution device 316 formed at a second depth of the device 300, wherein the two depths are different The devices 306 and 316 may have portions that extend into or from different depths. For example, an input waveguide coupled to the first Y-branch 308 may extend from a different depth of the device 300 or from a different waveguide layer, not shown.

The waveguide layers 302 and 304 may be formed of the same cladding material, for example a $SiO_2$ material as the cladding layer. Alternatively, each layer 302 and 304 may be formed of a different material. A $SiO_xN_y$ material, with x between and including 0 to 2 and y between and including 0 to 1.333, may be used as the waveguide core material. These x and y values are provided by example and apply to all $SiO_xN_y$ materials herein. Because the radii of curvature on the devices 306 and 316 are different, different $SiO_xN_y$ materials may be used in each of the layers 302 and 304. For example, the device 316, having a tighter radius of curvature than device 306, may have a $SiO_xN_y$ material that produces a higher index of refraction differential between the waveguides and surrounding cladding, than would the $SiO_xN_y$ material used with the device 306, which has a larger radius of curvature. As used herein, the term index of refraction differential, also referred to as the index of refraction contrast, refers to the difference between the index of refraction of a waveguide core region and a cladding region surrounding the core region, at a given reference wavelength.

Coupling of an optical clock signal for the output waveguides 312 and 314 into level 2 structures is achieved by evanescent coupling in the depicted illustration, i.e., by having waveguides adjacent to one another so that energy may flow between the two. Other coupling, such as direct or butt-coupling may also be used. Specifically, the waveguide 312 is disposed above or adjacent the input waveguide 324, thereby defining an overlapping or coupling length, D. In the illustrated example, the length D is chosen to ensure maximum coupling of energy. The waveguide 314 would similarly share a coupling length with a second level 2 structure (not shown) in the same manner. Furthermore, it will be understood that the level 2 structure 316 may also include output waveguides that are coupled to O/E converters or coupled to other structures like a level 3 structure in a third waveguide layer. In either case, the O/E converters or additional structure may alternatively be formed in the layer 304. In fact, while FIG. 4 shows two different waveguide layers 302 and 304, the H-tree distribution devices 306 and 316 may be formed at different depths in a single optical substrate and doped or fabricated to have different indices of refraction if desired.

Figure 6:
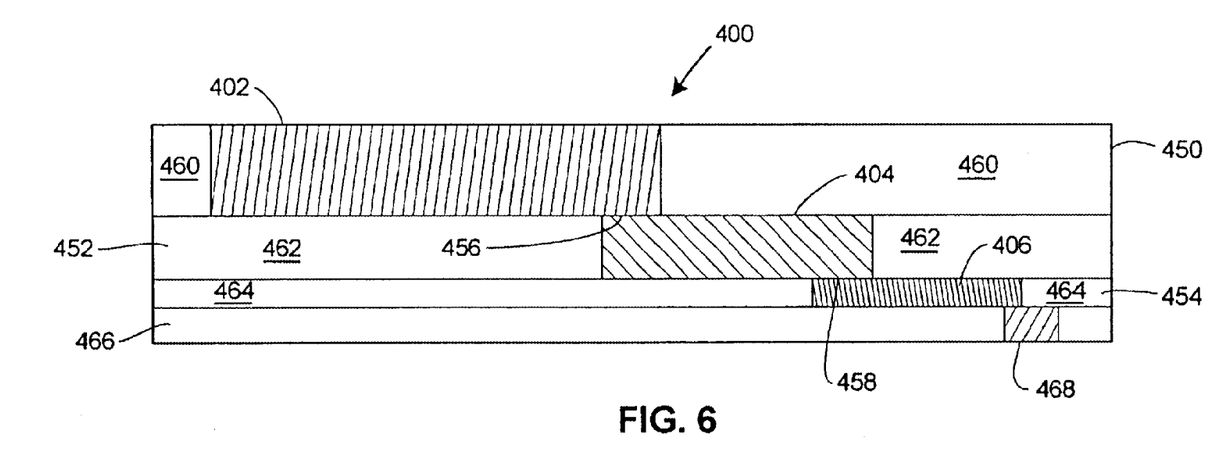
FIG. 6 is a side illustration of the structure of FIG. 5, taken along line AA, along with additional structure, showing evanescent coupling between H-tree distribution devices.

FIG. 5 illustrates a portion of an H-tree distribution network 400 formed of a level 1 H-tree distribution device 402, a level 2 H-tree distribution device 404, and two level 3 H-tree distribution devices 406 and 408. In the illustrated example, each level indication represents a structure of different waveguide dimension, width (FIG. 5) and height (FIG. 6). For example, an output waveguide 410 of the H-tree distribution device 402 may be wider than an input waveguide 412 of the H-tree distribution device 404 coupled thereto. An overlap between the waveguides 410 and 412 is shown for explanation purposes.

Figure 9:
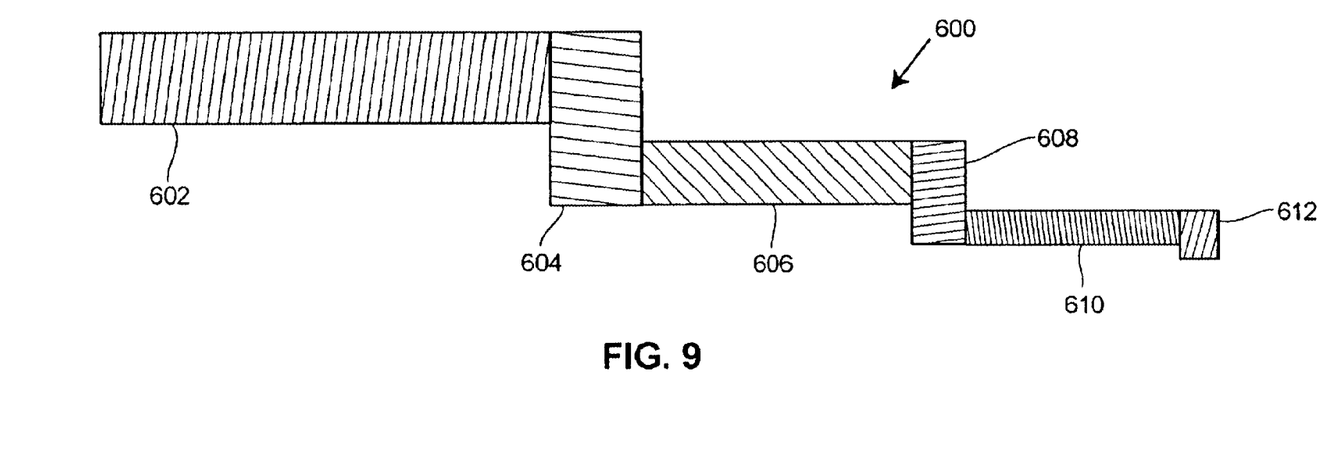
FIG. 9 is a side illustration, similar to that of FIG. 6, of another coupling between H-tree distribution devices.

FIG. 6 is an illustration of a side view of the device 400 taken along line AA of FIG. 5, with additional structure shown. The H-tree distribution device 402 is formed in a first waveguide layer 450; the H-tree distribution device 404 is formed in a second, smaller thickness waveguide layer 452; and the H-tree distribution device 406 is formed in a third, even smaller thickness waveguide layer 454. Further, the substrates 450, 452, and 454 are disposed adjacent one another, as illustrated, thereby allowing energy form one layer to couple into an adjacent layer. The waveguide layers 450, 452, and 454 need not be in this configuration. Instead, a cladding or buffer region may extend between layers. In the illustrated example, the H-tree distribution devices 402 and 404 share a coupling region 456. Similarly, the region 458 couples the H-tree distribution devices 404 and 406. Evanescent coupling occurs over the regions 456 and 458, in the illustrated embodiment. Alternatively, coupling between distribution devices may be through directional coupling, such as extending a coupling region between devices that otherwise do not touch one another. FIG. 9, described in more detail below, illustrates an example with a coupler extending between adjacent distribution devices.

With structures of different size formed in different waveguide layers, a network device can be formed of H-tree distribution devices having different optical properties. In the illustrated example of FIGS. 5 and 6, the H-tree distribution device 402 is a level 1 structure with a level 1 index of refraction that is smaller than a level 2 index of refraction for the H-tree distribution device 404. Thus, if cladding regions 460 and 462 of the layers 450 and 452, respectively, have substantially the same index of refraction, the index of refraction differential (or contrast) between waveguide and cladding for the H-tree distribution device 402 (i.e., $\Delta n1$) will be smaller than the index of refraction differential ($\Delta n2$) for the H-tree distribution device 404. Similarly, in the illustrated example, $\Delta n3$ for the H-tree distribution device 406 in the layer 454 having cladding region 464 is larger than $\Delta n2$. The cladding regions 460, 462 and 464 in the illustrated example may be made of $SiO_2$, for example, and the H-tree distribution devices 402, 404, and 406 may be made of $SiO_xN_y$, where x and y are chosen to form the desired Δn ratios. Example values are given above.

For optical distribution devices of increasingly smaller sizes, the index of refraction differential may be increased to reduce any bending losses on the propagating optical signal. By way of example only, the radii of curvature of the Y-branches described may range from 500 μm to sub 10 μm and the index of refraction differential, Δn, may range from approximately 0.05 to approximately 1, with a larger differential corresponding to smaller radii of curvature. These ranges are merely examples, however, and the radii of curvature and index of refraction differential may be chosen in any manner to minimize losses and increase scalability for any desired size of the optical distribution structure.

To provide O/E conversion, a fourth waveguide layer 466 is disposed adjacent the layer 454 and houses a photodetector 468 coupled to the H-tree distribution device 406. In this three level configuration, the level 3 H-tree distribution device 406 provides the output waveguides for the assembly 400. The photodetector 468 may be a silicon-based photodiode, for example, and is shown evanescently coupled to the H-tree distribution 406. The photodetector 468 may represent a separate device coupled to the H-tree distribution device 406. Other photodetection methods may also be used.

Figures 7, 8:
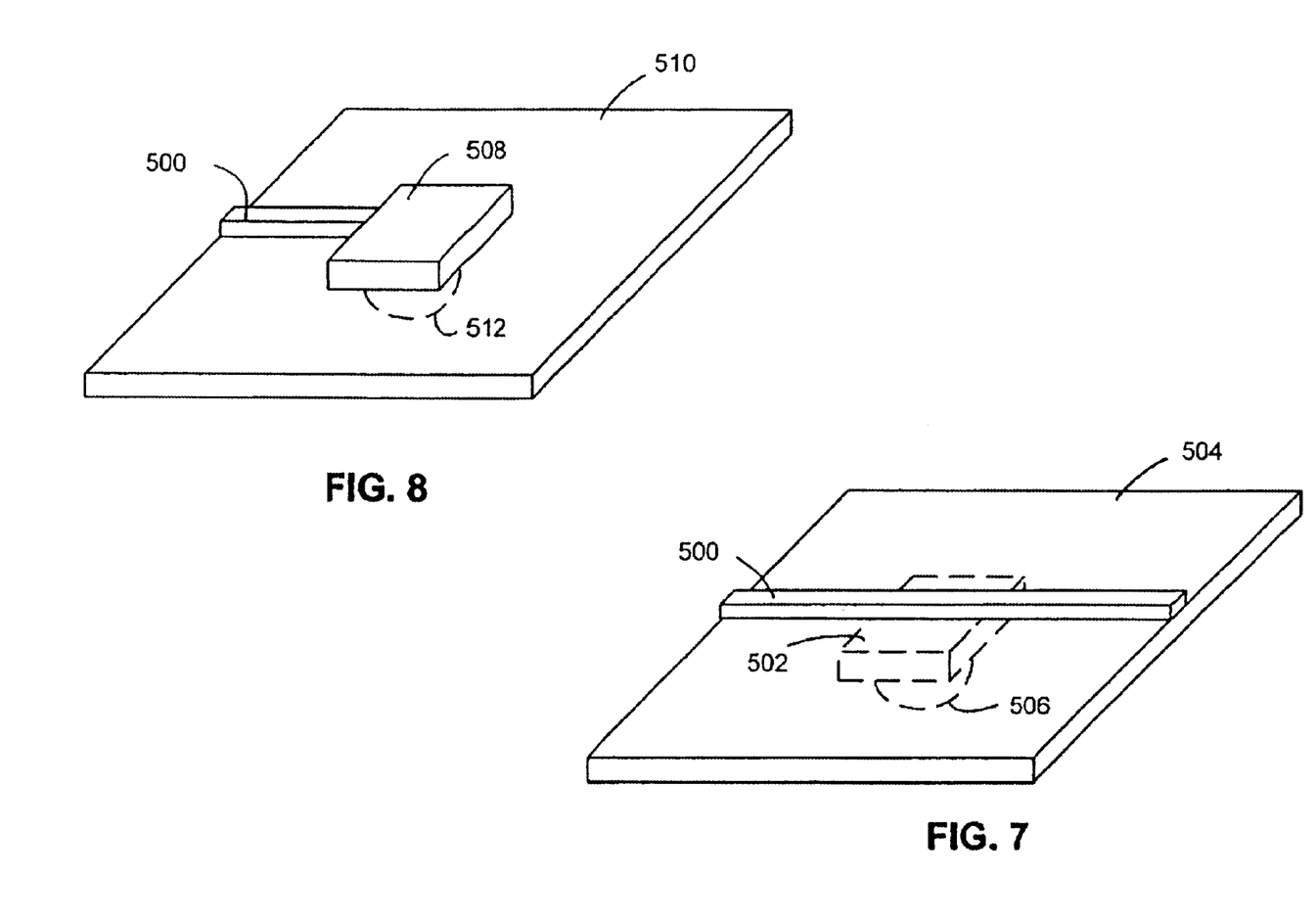
FIG. 7 is an illustration of an example coupling between an output waveguide of an H-tree distribution device and a photodetector.
FIG. 8 is an illustration of another example coupling between an output waveguide of an H-tree distribution device and a photodetector.

FIG. 7 shows another example of evanescent coupling in which an output waveguide 500 of an H-tree distribution device is disposed adjacent a photodetector 502 extending into a waveguide layer 504. The photodetector 502 converts an optical clock signal coupled from the waveguide 500 into an electrical signal, which may be communicated to circuitry through a conducting lead 506. FIG. 8 shows a similar structure to that of FIG. 7, but with the waveguide 500 direct or butt-coupled to a photodetector 508 formed at least partially extending above a surface of a waveguide layer 510. An anti-reflection coating may be used between the waveguide 500 and the butt-coupled photodetector 508 to reduce reflection loss. A conducting lead 512 extends from an opposite end of the layer 510 to couple an electrical clock signal to external circuitry. Other techniques, such as angling adjacent faces of the waveguide 500 and the photodetector 508, may also be used. In both FIGS. 7 and 8, the waveguide 500 may be a stand alone structure or may be formed in a layer (not shown) similar to that shown in FIG. 6.

FIGS. 7 and 8 show example techniques for integrating an optical-to-electrical converter into a multilayer distribution network by forming a layer with a photodetector adjacent the output waveguides of an H-tree distribution network. For example, if the smallest structure in a network (e.g., a level 3 H-tree distribution device in a three level structure) is formed in a bottom waveguide layer, a photodiode substrate layer may be coupled to this bottom waveguide layer. It will be understood by persons of ordinary skill in the art that other techniques may be used for such coupling and conversion. Furthermore, it will be understood that the photodetectors 468, 502, and 508 may be silicon-based structures or formed of other materials. Germanium-based materials, for example, may be particularly useful for converting optical signals propagating at approximately 1550 nm or 1310 nm, whereas silicon-based photodetectors may be desired for wavelengths such as approximately 850 nm or shorter wavelengths such as 400-650 nm.

FIG. 9 shows an optical device 600 with a generic coupling structure, where a first H-tree distribution device 602 is coupled to a coupler 604 that is also coupled to a second H-tree distribution device 606. The coupler 604 may be a coupling region, like a bulk region through which modal transformation between the structures 602 and 606 occurs. The coupler 604 may be a tapered waveguide or a prism or mirror that reflects energy from the structure 602 into the structure 606. Other coupling devices, whether based on modal transformation, like an interference-based optical structure, reflection, or the like will be known to persons of ordinary skill in the art. A similar coupler 608 couples the H-tree distribution device 606 with the H-tree distribution device 610, which is, in turn coupled to a photodetector 612.

Figure 10:
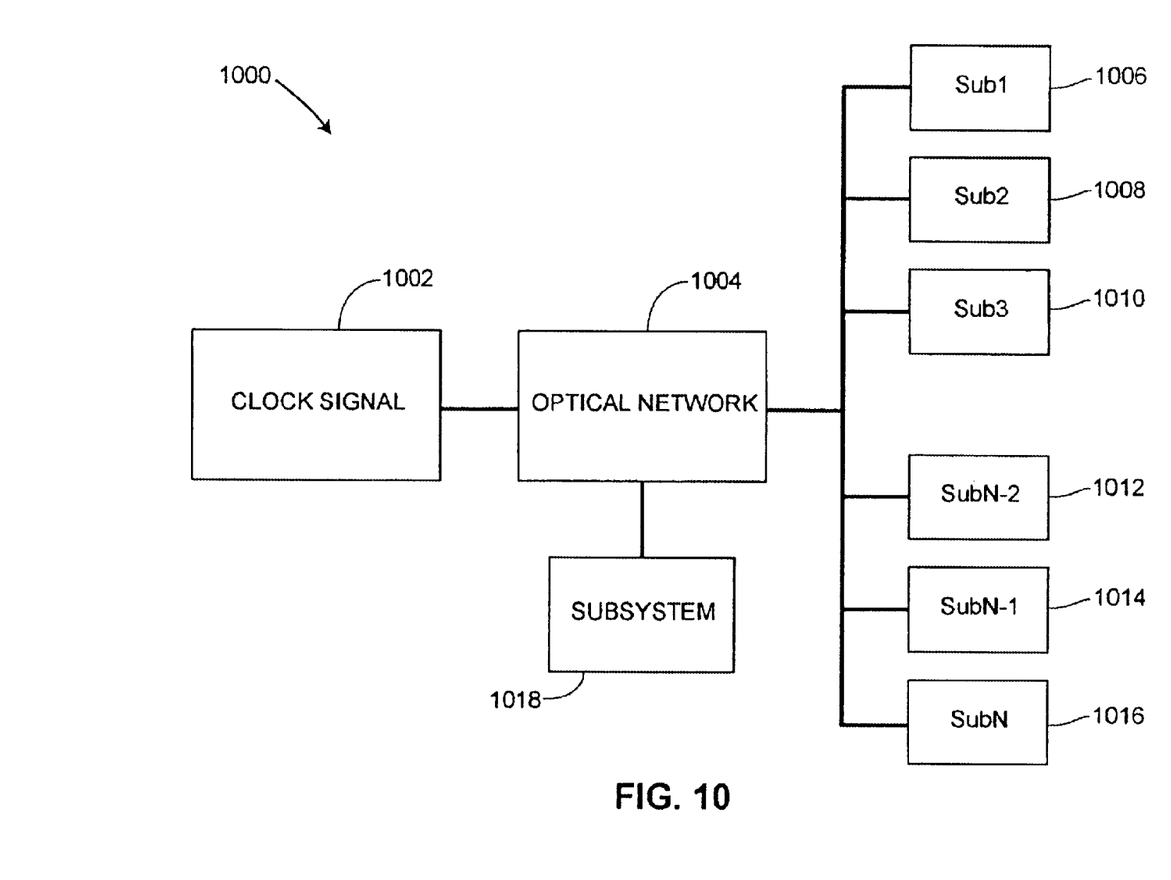
FIG. 10 illustrates a system that includes an optical network routing an optical signal to a plurality of subsystems.

FIG. 10 illustrates a system 1000 that provides a clock signal, or other optical signal, to devices within the system 1000 or devices connected thereto. By providing identical copies of the clock signal, these devices may be synchronized together.

The system 1000 includes a clock signal generator 1002 coupled to an optical network 1040. The clock signal generator may be a 10 GHz mode locked laser providing an optical clock signal, such lasers are known and may have better than 100 fs jitter. An optical fiber or waveguide may be used in coupling the generator 1002 to the network 1004. Other optical clock signal generators may also be used. The generator 1002 may alternatively provide an electrical clock signal that may be coupled to either the network 1004 directly or a separate device, where the electrical clock signal is converted to an optical clock signal. For example, an electrical clock signal may be used to modulate a laser to create an optical clock signal. The clock signal generator 1002 and the optical network 1004 may be integrated in a computer motherboard or on a microchip, or they may be separate devices.

The network 1004 is coupled to a series of subsystems Sub1 1006, Sub2 1008, Sub3 1010 . . . , SubN-2 1012, SubN-1, 1014, and SubN 1016, providing an optical clock signal to each. The subsystems 1006-1016 may represent a circuit, microprocessor, chipset, memory, I/O interface, or other device that typically receives a clock signal in a processor system. The generator 1002 provides a clock signal to the network 1004, which then creates identical copies of the clock signal. The copies are synchronized with the clock signal from the generator 1002 and are substantially identical in intensity and are in-phase. The network 1004 provides at least one copy to each of the subsystems 1006-1016. The network 1004 is also connected to a separate subsystem 1018 that may receive a different clock signal from that sent to the subsystems 1006-1016.

The network 1004 may be a network of individual H-tree distribution devices like any of those described hereinabove.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. An optical network device for distributing an input signal, the optical network device comprising:
   an input waveguide for providing the input signal;
   a first H-tree distribution device coupled to the input waveguide and positioned at least partially at a first depth of the optical network devices, the first H-tree distribution device spanning a first area; and
   a second H-tree distribution device coupled to the first H-tree distribution device and positioned at least partially at a second depth of the optical network device, the second H-tree distribution device spanning a second area, wherein the second area is smaller than the first area and wherein the first depth is different than the second depth.

2. The optical network device of claim 1, wherein the first H-tree distribution device is formed in a first waveguide layer and wherein the second H-tree distribution device is formed in a second waveguide layer.

3. The optical network device of claim 2, wherein the first waveguide layer has a first cladding region and wherein the first H-tree distribution devices has a first index of refraction differential with the first cladding region, and wherein the second waveguide layer has a second cladding region and wherein the second H-tree distribution device has a second index of refraction differential with the second cladding region.

4. The optical network device of claim 3, wherein the first index of refraction differential is smaller than the second index of refraction differential.

5. The optical network device of claim 3, wherein the first cladding region and the second cladding region are formed of the same material.

6. The optical network device of claim 3, wherein the first index of refraction differential is different than the second index of refraction differential.

7. The optical network device of claim 2, wherein the first waveguide layer is adjacent the second waveguide layer.

8. The optical network device of claim 1, wherein the first H-tree distribution device is formed from a plurality of first Y-branches each having a first radius of curvature and wherein the second H-tree distribution device is formed from a plurality of second Y-branches each having a second radius of curvature.

9. The optical network device of claim 8, wherein the first radius of curvature is larger than the second radius of curvature.

10. The optical network device of claim 8, further comprising a third H-tree distribution device formed from a plurality of third Y-branches each having a third radius of curvature, wherein the third radius of curvature is smaller than the second radius of curvature or the first radius of curvature.

11. The optical network device of claim 1, further comprising a coupler coupling the second H-tree distribution device and the first H-tree distribution device.

12. The optical network device of claim 1, further comprising a third H-tree distribution device coupled to the second H-tree distribution device and positioned at least partially at a third depth of the optical network device that is different from the first depth and the second depth, the third H-tree distribution device spanning a third area that is smaller than the second area or the first area.

13. The optical network device of claim 1, wherein the first H-tree distribution device and the second H-tree distribution device are formed in a single optical substrate.

14. The optical network device of claim 1, wherein the second H-tree distribution device is coupled to the first H-tree distribution device through direct coupling.

15. The optical network device of claim 1, wherein the second H-tree distribution device is coupled to the first H-tree distribution device through evanescent coupling.

16. The optical network device of claim 1, further comprising at least one photodetector coupled to the second H-tree distribution device and adapted to convert an optical signal propagating in the second H-tree distribution device to an electrical signal.

17. The optical network device of claim 1, wherein the first H-tree distribution device comprises a plurality of first Y-branches each having a first width, and wherein the second H-tree distribution device comprises a plurality of second Y-branches each having a second width different than the first width.

18. The optical network device of claim 1, wherein the first H-tree distribution device comprises a plurality of first Y-branches each having a first thickness, and wherein the second H-tree distribution device comprises a plurality of second Y-branches each having a second thickness different than the first thickness.

19. A multi-layer optical device comprising:
a first waveguide layer having a cladding region and a first H-tree distribution device;
a second waveguide layer having a cladding region and a second H-tree distribution device, wherein the second waveguide layer is disposed adjacent to the first waveguide layer to couple the first H-tree distribution device to the second H-tree distribution device; and
wherein the first H-tree distribution device has a first index of refraction differential with the cladding region of the first waveguide layer, and the second H-tree distribution device has a second index of refraction differential with the cladding region of the second waveguide layer, the second index of refraction differential is different than the first index of refraction differential.

20. The multi-layer optical device of claim 19, wherein the first H-tree distribution device spans a first area, and wherein the second H-tree distribution device spans a second area that is smaller than the first area.

21. The multi-layer optical device of claim 20, wherein the first H-tree distribution device is formed from a plurality of first Y-branches each having a first radius of curvature and wherein the second H-tree distribution device is formed from a plurality of second Y-branches each having a second radius of curvature.

22. The multi-layer optical device of claim 21, wherein the first radius of curvature is larger than the second radius of curvature.

23. The multi-layer optical device of claim 19, further comprising a coupler coupling the first waveguide layer and the second waveguide layer.

24. The multi-layer optical device of claim 19, wherein the second H-tree distribution device is coupled to the first H-tree distribution device through evanescent coupling.

25. The multi-layer optical device of claim 19, wherein the first index of refraction differential is smaller than the second index of refraction differential.

26. The multi-layer optical device of claim 19, wherein the second H-tree distribution device is coupled to the first H-tree distribution device through direct coupling.

27. A method of forming an optical distribution device for receiving an input signal, the method comprising:
forming an input waveguide for propagating the input signal;
coupling a first H-tree distribution device in a first waveguide layer to the input waveguide, the H-tree distribution device spanning a first area; and
coupling a second H-tree distribution device in a second waveguide layer to the first H-tree distribution device, the second H-tree distribution device spanning a second area different than the first area.

28. The method of claim 27, wherein the first waveguide layer has a first cladding region and wherein the first H-tree distribution device has a first index of refraction differential with the first cladding region; and wherein the second waveguide layer has a second cladding region and wherein the second H-tree distribution device has a second index of refraction differential with the second cladding region that is greater than the first index of refraction differential.

29. The method of claim 28, wherein the first cladding region and the second cladding region are formed of the same material.

30. The method of claim 27, further comprising coupling the second H-tree distribution device to the first H-tree distribution device through direct coupling.

31. The method of claim 30, further comprising disposing a coupler between the second H-tree distribution device and the first H-tree distribution device.

32. The method of claim 27, further comprising coupling the second H-tree distribution device to the first H-tree distribution device through evanescent coupling.

33. The method of claim 27, further comprising evanescently coupling a photodetector to the second H-tree distribution device.

34. The method of claim 27, further comprising directly coupling a photodetector to the second H-tree distribution device.

35. The method of claim 27, wherein coupling the first H-tree distribution device comprises forming a first plurality of Y-branches within the first waveguide layer, at least one of the plurality of first Y-branches having a first radius of curvature, and wherein coupling the second H-tree distribution device comprises forming a plurality of second Y-branches within the second waveguide layer, at least one of the plurality of second Y-branches having a second radius of curvature different than the first radius of curvature.

36. The method of claim 27, further comprising:
forming a first plurality of Y-branches within the first waveguide layer, each of the first plurality of Y-branches having a first width; and
forming a second plurality of Y-branches within the second waveguide layer, each of the second plurality of Y-branches having a second width different than the first width.

37. The method of claim 27, further comprising:
forming a first plurality of Y-branches within the first waveguide layer, each of the first plurality of Y-branches having a first thickness; and
forming a second plurality of Y-branches within the second waveguide layer, each of the second plurality of Y-branches having a second thickness different than the first thickness.

38. A method of distributing an input signal comprising:
propagating the input signal on an input waveguide;
coupling the input signal into a primary H-tree distribution device coupled to the input waveguide, the primary H-tree distribution device formed in a first waveguide layer and spanning a first area; and
in response to coupling the input signal into the primary H-tree distribution device, forming a first plurality of output signals;
coupling at least one of the plurality of output signals to at least one secondary H-tree distribution device formed in a second waveguide layer and spanning a second area different than the first area.

39. The method of claim 38, further comprising:
forming the second waveguide layer adjacent the first waveguide layer to couple the secondary H-tree distribution device to the primary H-tree distribution device.

40. The method of claim 38, further comprising:
propagating at least a portion of the input signal through a plurality of first Y-branches, each having a first radius of curvature; and
propagating at least a portion of the at least one the plurality of output signals through a plurality of second Y-branches, each having a second radius of curvature different than the first radius of curvature.

41. The method of claim 38, wherein the first waveguide layer has a first cladding region and wherein the primary H-tree distribution device has a first index of refraction differential with the first cladding region; and wherein the second waveguide layer has a second cladding region and wherein the secondary H-tree distribution device has a second index of refraction differential with the second cladding region that is greater than the first index of refraction differential.

* * * * *